US010311041B2

(12) United States Patent
Suzuki

(10) Patent No.: US 10,311,041 B2
(45) Date of Patent: Jun. 4, 2019

(54) FILE MANAGEMENT APPARATUS

(71) Applicant: Hitachi Solutions, Ltd., Tokyo (JP)

(72) Inventor: Takanori Suzuki, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 258 days.

(21) Appl. No.: 15/076,997

(22) Filed: Mar. 22, 2016

(65) Prior Publication Data

US 2016/0283508 A1    Sep. 29, 2016

(30) Foreign Application Priority Data

Mar. 27, 2015 (JP) ................... 2015-066057

(51) Int. Cl.
G06F 16/00 (2019.01)
G06F 16/23 (2019.01)

(52) U.S. Cl.
CPC .................. G06F 16/2358 (2019.01)

(58) Field of Classification Search
CPC .................. G06F 17/24; G06F 17/2288
USPC .................................. 707/625, 609
See application file for complete search history.

(56) References Cited

U.S. PATENT DOCUMENTS 5,806,078 A * 9/1998 Hug ..................... G06F 17/2288
707/999.202
6,760,840 B1 * 7/2004 Shimbo ................. G06F 17/24
380/29
7,631,185 B2 * 12/2009 Shimbo ................. G06F 17/24
713/165
8,943,197 B1 1/2015 Taylor et al.
9,218,376 B2 * 12/2015 Muller ............. G06F 17/30283
2002/0073415 A1 * 6/2002 Kim ..................... G06F 9/4411
717/173
2005/0165760 A1 * 7/2005 Seo ........................... G06F 8/71
2006/0015811 A1 1/2006 Tanaka et al.
2006/0288056 A1 * 12/2006 Yamakawa ......... G06F 17/3023
2008/0040388 A1 * 2/2008 Petri ................. G06F 17/30144
2009/0083314 A1 * 3/2009 Maim ................. G06F 17/2211
(Continued)

FOREIGN PATENT DOCUMENTS

JP    2006-031292 A    2/2006
JP    2011-198275 A    10/2011

OTHER PUBLICATIONS

Canadian Office Action received in corresponding Canadian Application No. 2,924,856 dated Mar. 20, 2017.
(Continued)

Primary Examiner — Hanh B Thai
(74) Attorney, Agent, or Firm — Mattingly & Malur, PC

(57) ABSTRACT

To provide an apparatus that can reduce cumbersome input by a user, while being capable of indicating changes efficiently. Files F1, F2 . . . are recorded in a recording part 8. The file F1 is an old version, and the file F2 is an updated new version. A difference extraction means 2 compares the file F1 which is the old version with the file F2 which is the new version, and extracts difference between the versions. On the basis of a difference condition 6 that is recorded in advance, a change notification means 4 determines whether each extracted difference satisfies the difference condition. The change notification means 4 notifies, to a terminal apparatus 10 of a user who registers the difference condition 6, the changed part, when the extracted difference satisfies the difference condition.

3 Claims, 11 Drawing Sheets

(56) References Cited

U.S. PATENT DOCUMENTS

2009/0248954 A1* 10/2009 Hiraiwa ............ G06F 17/30073
    711/100
2011/0238617 A1   9/2011 Ozawa et al.
2011/0295978 A1* 12/2011 Pazos .................. H04H 20/426
    709/219
2015/0207862 A1*  7/2015 Imbimbo .......... G06F 17/30867
    709/201

OTHER PUBLICATIONS

Japanese Office Action received in corresponding Japanese Application No. 2015-066057 dated Dec. 25, 2018.

* cited by examiner

FIG.5A

| User ID | Specified keyword ID | | |
|---|---|---|---|
| ... | ... | ... | ... |
| 132845 | 011 | 034 | ... |
| 132846 | 012 | 010 | ... |
| 132847 | 098 | 039 | ... |
| ... | ... | ... | ... |

FIG.5B

| Specified keyword ID | Specified keyword |
|---|---|
| ... | ... |
| 010 | Bug |
| 011 | System |
| 012 | Due date |
| ... | ... |

FIG.6

| File ID | Version | File data |
|---|---|---|
| ... | ... | ... |
| 743 | 1 | (File entity) |
| 743 | 2 | (File entity) |
| 744 | 1 | (File entity) |
| 744 | 2 | (File entity) |
| 744 | 3 | (File entity) |
| 744 | 4 | (File entity) |
| 744 | 5 | (File entity) |
| ... | ... | ... |

FIG.7

| File ID | New version | Old version | Difference position | Change flag | New version keyword ID | Old version keyword ID |
|---|---|---|---|---|---|---|
| ⋮ | ⋮ | ⋮ | ⋮ | ⋮ | ⋮ | ⋮ |
| 744 | 5 | 4 | 1345 | 0 | | 010 |
| 744 | 5 | 4 | 3501 | 1 | 010 | |
| 744 | 5 | 4 | 3908 | 1 | 012 | |
| 744 | 5 | 4 | 4431 | 0 | | 012 |
| ⋮ | ⋮ | ⋮ | ⋮ | ⋮ | ⋮ | ⋮ |

FIG.8

The following shared file has been changed.

| | |
|---|---|
| File name | sekkei.pdf |
| Time and date of change | 2015/2/4 |
| Changed part | Specified keyword |
| Chapter 1, line 3 | Bug |
| Chapter 2, line 36 | Bug |
| . | . |
| . | . |
| . | . |

FIG.9

3 System architecture

In this chapter, the architecture of the web-based patent management
system providing RBAC as described in the previous chapter will be
explained. This design assumes the use of Microsoft WINDOWS™ server.
This system has two features. First, the system has a function to check the
validity of a due date input by a ~~user~~ in the sight of the law.
    Secondary, the system has a function to correct bugs automatically. This
is ...

| User ID | File ID | Specified position | |
|---|---|---|---|
| ... | ... | ... | ... |
| 132845 | 347 | Chapter 1, section 1, line 340 to 352 | Chapter 1, section 10, line 34 to 52 |
| 132845 | 201 | 3456th character to 3807th character | 9011th character to 9320th character |
| 132846 | 347 | Chapter 7, section 1, line 220 to 239 | Chapter 7, section 8, line 22 to 29 |
| 132847 | 347 | Chapter 15, section 3, line 22 to 29 | Chapter 16, section 1, line 20 to 39 |
| ... | ... | ... | ... |

FIG.11

| File ID | New version | Old version | Difference position in old version |
|---|---|---|---|
| ... | ... | ... | ... |
| 744 | 5 | 4 | Chapter 1, section 1, line 340 to 352 |
| 744 | 5 | 4 | Chapter 1, section 10, line 34 to 52 |
| 744 | 5 | 4 | Chapter 7, section 1, line 220 to 239 |
| 744 | 5 | 4 | Chapter 15, section 3, line 203 to 214 |
| ... | ... | ... | ... |

FILE MANAGEMENT APPARATUS

BACKGROUND OF THE INVENTION

Field of the Invention

The present invention relates to a technology for efficiently informing a user of a change in an apparatus to manage files together with versions thereof.

Description of the Related Art

An apparatuses for managing versions and recording files has been used. Such an apparatus holds records of changes in file contents, and thus it is effective to manage files that may be changed by multiple users.

Such a file management apparatus includes a system in which, when a file is updated, the new version of the file is compared with the old version of the file, and then the difference between the versions is displayed. This system automatically extracts the change, so that users can check the change.

Further, Patent Document 1 proposes an apparatus in which a user attaches a changed part to a file as a comment, and then the comment, together with the file, is recorded. This apparatus can record changes appropriately.

PRIOR ART DOCUMENTS

Patent Document

[Patent Document 1] Japanese Unexamined Patent Application Publication No. 2006-31292

BRIEF SUMMARY OF THE INVENTION

However, there is a problem that the system of automatically extracting differences, which leads the differences mechanically, provides a large number of representations including those that are not important for a certain user or are merely formal, resulting in difficulty in recognition of the changes.

On the contrary, the system where a change is recorded as a comment by a user, as described in Patent Document 1, does not have the above-described problem. However, there is a problem that it is cumbersome for users, because they have to create and record comments at each time of file update.

An object of the present invention is to provide an apparatus that can solve the above-described problem, i.e., reduce cumbersome input by a user, while being capable of indicating changes efficiently.

Means employed in the present invention to solve any of the above-described problems will be described below. It is noted that each of the features described below are independently employable.

(1)(2)(7) A file management apparatus in accordance with the present invention comprises, a file recording part configured to record a file together with a version thereof, a difference extraction means configured to compare the latest version of the file with an old version of the file, and extract the difference between the versions, and a change notification means configured to determine, on the basis of a difference condition specified by a user, whether the extracted difference satisfies the difference condition, and to notify the user who specifies the difference condition when the extracted difference satisfies the difference condition.

Therefore, update notification is sent, only when the extracted difference satisfies the difference condition specified by the user, and thus, it is possible to efficiently provide the user with difference information.

(3) In the file management apparatus in accordance with the present invention, the difference condition is that the extracted difference includes a predetermined number or more, or a predetermined percentage or more of a specified keyword.

Therefore, it is possible not to inform the user when a change is not significant.

(4) In the file management apparatus in accordance with the present invention, the difference condition is that the occurrence position of the extracted difference coincides a specified occurrence position.

Therefore, it is possible to obtain information about the presence of updates by specifying a position.

(5) In the file management apparatus in accordance with the present invention, the difference condition is recorded in a difference condition recording part in advance.

Therefore, once the difference condition is registered, it is possible to receive a notification at each time of file update.

(6) In the file management apparatus in accordance with the present invention, the difference condition is transmitted from a terminal apparatus.

Therefore, it is possible to specify a difference condition and know the presence of updates at each time of the transmission.

In an embodiment, "difference extraction means" corresponds to step S3.

In an embodiment, "change notification means" corresponds to step S6.

The concept of the term "program" includes a program that is directly executable by a CPU, as well as a program in a source format, a compressed program, an encrypted program, and the like.

BRIEF DESCRIPTION OF THE SEVERAL VIEWS OF THE DRAWINGS

FIGS. 5A-5B show registration tables for specified keywords.

FIG. 6 shows a recording state of files.

FIG. 7 shows a difference table.

FIG. 8 shows a screen example of a change notification.

FIG. 9 shows a screen example for indicating changed parts in a file.

FIG. 10 is an example of a table, showing specified positions.

FIG. 11 shows a difference table.

DETAILED DESCRIPTION OF THE INVENTION

1. General Configuration

Figure 1:
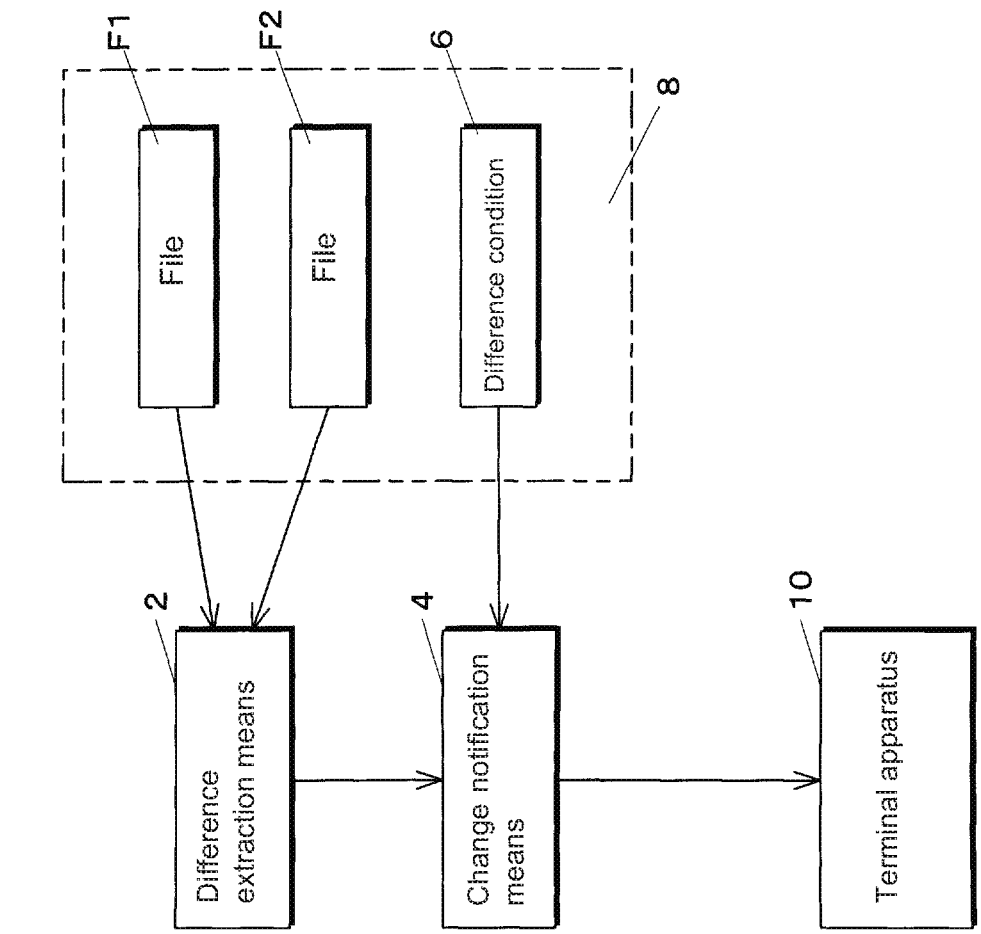
FIG. 1 is a function block diagram of a file management apparatus according to an embodiment of the present invention.

FIG. 1 is a function block diagram of a file management apparatus in accordance with the present invention. Files F1, F2 . . . are recorded in a recording part 8. The file F1 is an old version, and the file F2 is an updated new version.

A difference extraction means 2 compares the file F1 which is the old version with the file F2 which is the new version, and extracts difference between the versions. On the basis of a difference condition 6 that is recorded in advance, a change notification means 4 determines whether each extracted difference satisfies the difference condition. The change notification means 4 notifies, to a terminal apparatus 10 of a user who registers the difference condition 6, the changed part, when the extracted difference satisfies the difference condition.

2. System Configuration

Figure 2:
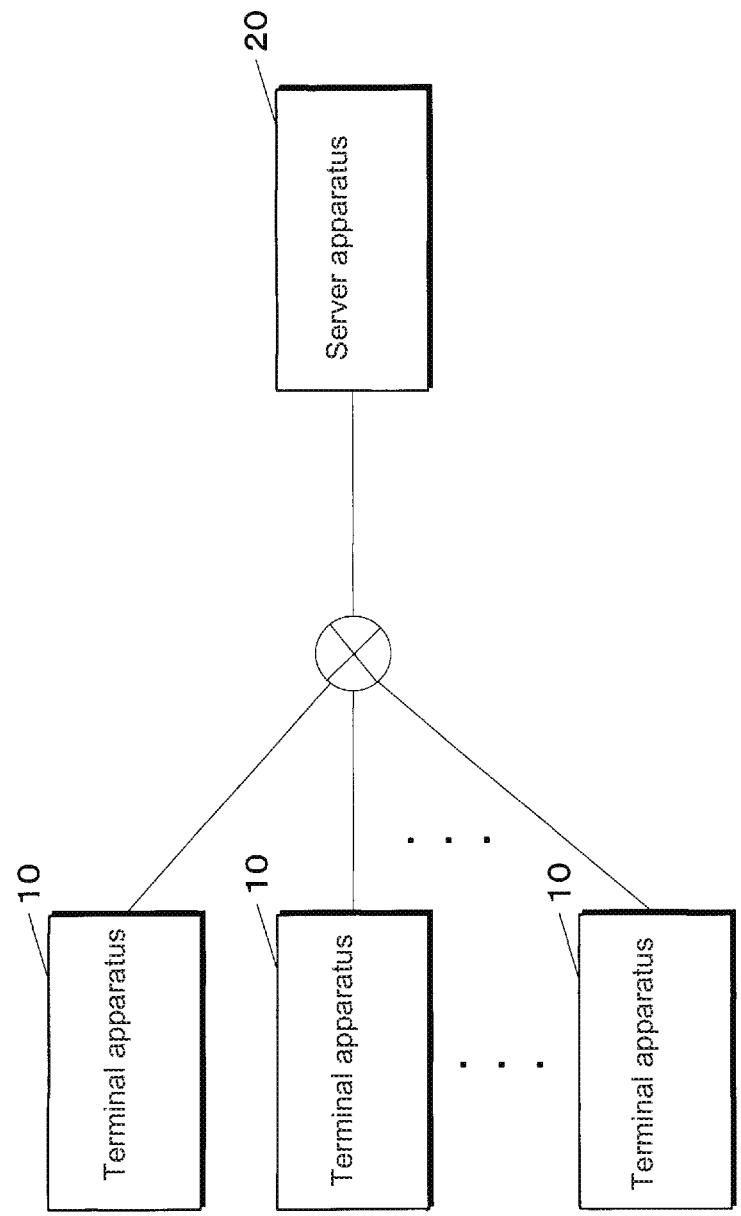
FIG. 2 is a system configuration diagram in which the file management apparatus is a server apparatus 20.

FIG. 2 shows a configuration when constructing a system in which the file management apparatus is a server apparatus 20. The server apparatus 20 is provided with a recording part for recording files. Users operate the terminal apparatuses 10, 10 . . . to browse and update the files in the server apparatus 20.

Figure 3:
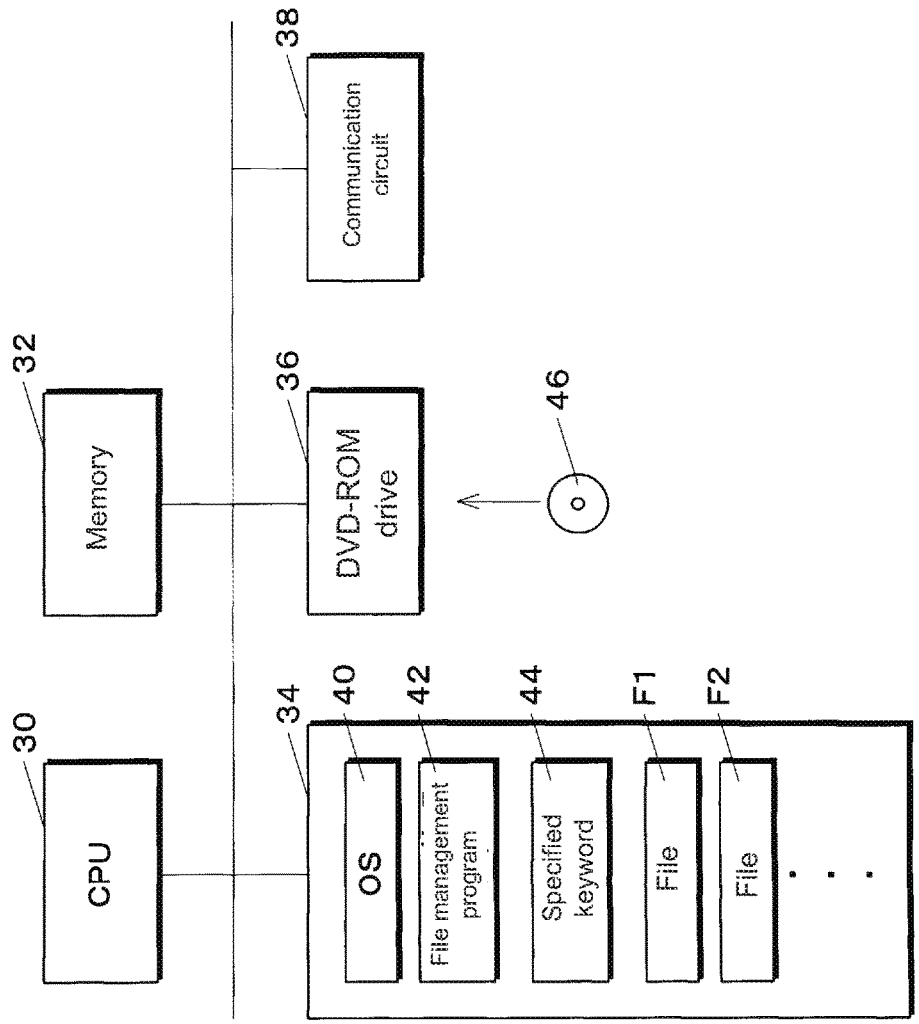
FIG. 3 shows a hardware configuration of the server apparatus 20.

FIG. 3 shows a hardware configuration of the server apparatus 20. A CPU 30 is connected with a memory 32, a hard disk 34, a DVD-ROM drive 36, and a communication circuit 38. The communication circuit 38 communicates with the terminal apparatus 10 via a network.

An operating system 40, and file management programs 42 are recorded in the hard disk 34. The file management programs 42 cooperate with the operating system 40 to perform their function. These programs, which are originally recorded in a DVD-ROM 46, are installed in the hard disk 34 by using the DVD-ROM drive 36. It is noted that these programs may be downloaded via the Internet, for example.

The hardware configuration of the terminal apparatus 10 is similar to that of the server apparatus 20. However, the terminal apparatus 10 is provided with a display, a keyboard/mouse, and the hard disk 34 in which a terminal program is recorded.

3. Processes by File Management Program 42

Figure 4:
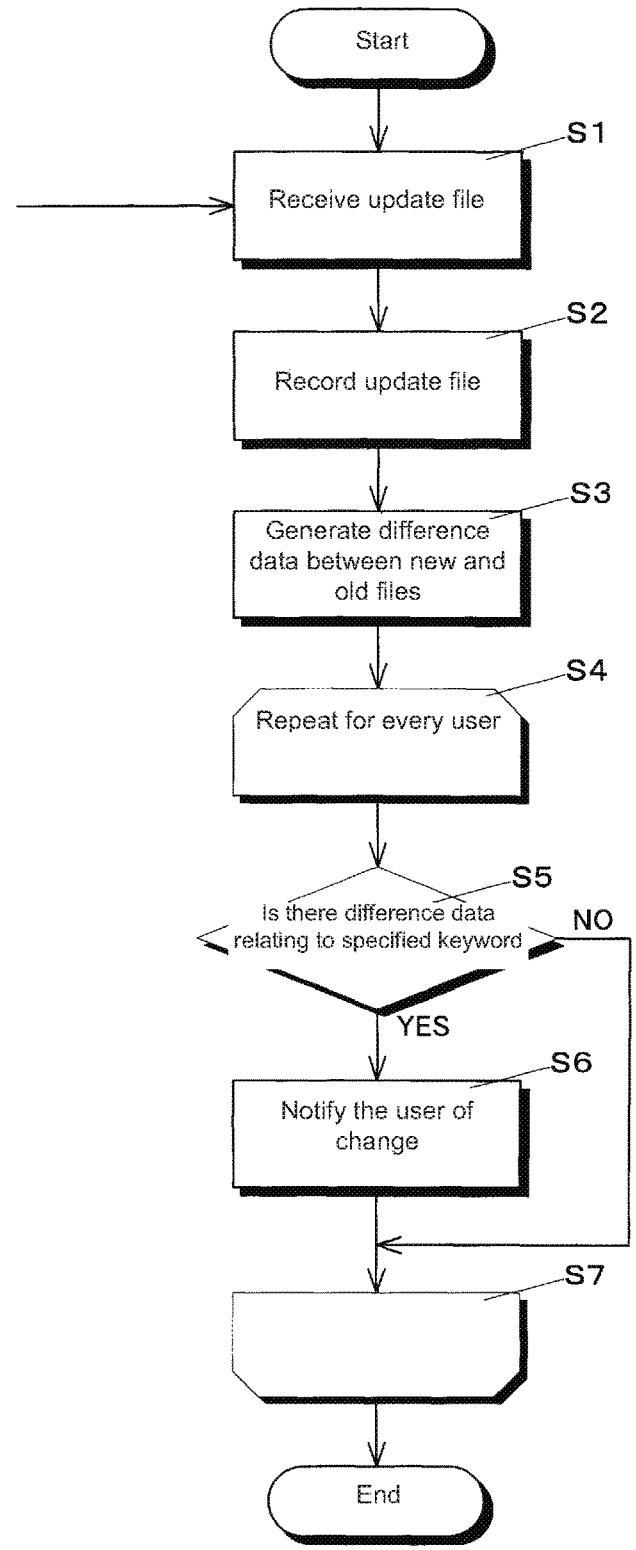
FIG. 4 is a flowchart of a file management program 42.

FIG. 4 shows a flowchart of the file management program 42. A user of each terminal apparatus 10 operates the terminal apparatus 10 to access the server apparatus 20, and register in advance keywords in which the user is interested. FIGS. 5A and 5B show a list of specified keywords 44 recorded in the hard disk 34 of the server apparatus 20.

As shown in FIG. 5B, the specified keywords registered by each user are recorded with specified keyword IDs. As shown in FIG. 5A, the specified keyword ID is recorded with a user ID of each user associated with the specified keyword ID, and thereby it is possible to recognize the specified keyword, which is registered by each user.

The CPU 30 of the server apparatus 20 receives an update file from the terminal apparatus 10 (step S1). When the CPU 30 receives such order of a file update from the user of the terminal apparatus 10, the CPU 30 records the new file in the hard disk 34, while retaining the old file (step S2).

FIG. 6 shows files recorded in the hard disk 34. Data of a file entity (including a file name, a date of update, and the like), together with a file ID and a file version, is recorded. It is noted that, instead of a file entity, a link or a location to the file entity may be recorded. As shown in the figure, for the file having the file ID "743", there are versions "1" and "2". Further, for the file having the file ID "744", there are versions "1" to "5" in the figure. Hereinafter, description of the case will be proceeded where data of the version "5" of the file having the file ID "744" is transmitted from the terminal apparatus 10.

Now, the CPU 30 extracts, for the updated file, difference between the previous version of the file to generate difference data (step S3). That is, the difference data is generated on the basis of the difference between the version "5" and the version "4" of the file having the file ID "744". In this embodiment, difference data is generated only for parts where any of the specified keywords specified by each user is deleted or added.

It is noted that such generation of difference data is achieved by extracting differences generally, and then selecting differences associated with either data which is deleted from the old version and includes the specified keyword, or data which appears in the new version and includes the specified keyword.

FIG. 7 shows an example of generated difference data. A comparison target is identified by a file ID, and version numbers of the new version and the old version. In this figure, differences between the version "5" and the version "4" of the file having the file ID "744" are shown. A difference position represents a position (a position in the new version of the file) where a difference occurs. In this embodiment, the position is represented by the number of characters from the beginning of the file.

A change flag represents detail of an update for a certain keyword. In this embodiment, "0" means deletion. That is, "0" means that a keyword present in the old version is deleted in the new version. "1" means addition. That is, "1" means that a keyword that is not present in the old version appears in the new version. In the case of deletion, the ID of the keyword present in the old version is recorded in an old version keyword ID. Further, in the case of addition, the ID of the keyword appearing in the new version is recorded in a new version keyword ID.

Next, the CPU 30 determines whether the above-described difference data (the new version keyword or the old version keyword) includes the specified keyword specified by the target user (step S5). When no difference data including the specified keyword is found, the CPU 30 performs an identical or similar process for the next user (step 4).

When a difference data including the specified keyword is found, the user is notified of the detail of the update via an email or the like, on the basis of the difference data (step S6). It is noted that an email address of each user can be obtained from user data recorded in the hard disk 36 at the time of the user registration.

The CPU 30 transmits a notification screen displaying the name of the changed file, changed parts, keywords etc., to the terminal apparatus 10. FIG. 8 shows an example of the notification screen displayed in the terminal apparatus 10. In this embodiment, structures including chapter and section are displayed in the changed parts, since these structures are recorded in the file entity. Further, the changed parts have a link to the corresponding part of the file entity. Therefore, when the user operating the terminal apparatus 10 clicks on the link, the changed part is displayed.

FIG. 9 shows a screen displayed by the operation. An added keyword 100 is displayed in bold with a line enclosing the keyword, and thus the user can see the keyword at a glance. It is noted that when the keyword is deleted, the deleted keyword with a strikeout 102 is displayed in order to be recognized as the deleted keyword.

The above-described processes are performed for all the users who register the keywords.

In this way, once each user specifies and registers a keyword in advance, the user can receive a notification automatically when a change relating to the keyword occurs in any of files.

4. Other embodiments (1) In the above-described embodiment, only differences relating to a keyword specified by anyone of users are extracted. However, the CPU 30 may extract all differences regardless of the keyword, and then determine whether the differences include the keyword for each specified keyword of each user.

(2) In the above-described embodiment, a keyword is specified as a difference condition to receive a notification. However, a file name, a filename extension, a time and date of update, an update position in a file, and the like may be the difference condition. Further, the combination thereof may also be the difference condition.

FIG. 10 shows a specified position table when an update position in a file is a difference condition, and FIG. 11 shows an example of a difference table. As shown in FIG. 10, each user specifies a position in each file and registers the position. When a file is defined structurally (for example, when positions are managed by using chapters and sections), positions are specified and registered according to the structure. Otherwise, positions are specified and registered by the number of characters from the beginning of the file.

It is noted that during the registration, the terminal apparatus 10 may display the file, and the above-described position data corresponding to a region on which a user clicks by using a mouse and the like may be recorded.

FIG. 11 shows an example of a difference table. When a change occurs at the position specified by each user, the change is extracted and recorded.

The flow of processes is similar to that shown in FIG. 4. However, as a file update occurs, the specified position may shift. Therefore, in this embodiment, when the specified position is affected by the file update, a notification urging the user to re-register the position is sent to the user.

Alternatively, the specified position table may be automatically updated by converting the specified position in the old version into a position in the updated version.

According to this embodiment, it is possible to notify a user of an update of the file contents in which the user is interested on the basis of the specified location. For example, a user may receive a notification, only when a chapter of system requirements in a system design document is updated.

(3) In the above-described embodiment, the difference condition is registered in advance. However, the server apparatus 20 may transmit a search screen to the terminal apparatus 10 when needed, and the server apparatus 20 may extract updated parts to transmit them to the terminal apparatus 10 according to the difference condition (such as a keyword) input to the search screen.

(4) In the above-described embodiment, a notification is sent, every time there is an update including the specified keyword specified by the user (an update in which the keyword is added or deleted). However, a notification of update for the file may be sent, only when the number of updates including the specified keyword in a single file is greater than a predetermined number. Alternatively, a notification of update for the file may be sent, only when the percentage of the number of updates including the specified keyword, in the number of the words (preferably, only nouns) included in a single file, is greater than a predetermined percentage.

The invention claimed is:

1. A file server, comprising,
   a processor coupled to an interface that is coupled to a plurality of user terminals;
   a storage medium; and
   a memory coupled to the processor, the memory storing instructions that when executed by the processor configure the processor to:
   store in the storage medium a user identifier for each of the plurality of users and one or more keywords associated with each user identifier,
   store in the storage medium a plurality of file identifiers each identifying a file and a version associated with each file identifier, and data of the respective files, including first data of a first file having a first file identifier and a first version,
   receive from a first user terminal via the interface second data of a second version of the first file having the first file identifier that is different from the first version of the first file identifier,
   generate difference data indicating a difference between the first data of the first version of the first file and the second data of the second version of the first file, the difference data indicating at least one of the one or more keywords associated with each user identifier is added or deleted in the second version of the first file compared to the first version of the first file and a position in the second version of the file where the change occurred, and
   upon determining that a number of occurrences of the addition or deletion of the at least one of the keywords occurs a predetermined number or more, notify the first user terminal of the addition or deletion of the at least one of the keywords in the second version of the first file and the position of each of the occurrences of the respective change in the second version of the first file based on the difference data.

2. The apparatus according to claim 1, wherein
   the processor is configured to:
   determine if the at least one of the one or more keywords associated with each user identifier is added or deleted occurs in a position in the second version of the first file that is specified by the first user.

3. A file management method by a server, the server including a storage medium and an interface connected to a plurality of user terminals, the method comprising:
   storing in the storage medium a user identifier for each of the plurality of users and one or more keywords associated with each user identifier,
   storing in the storage medium a plurality of file identifiers each identifying a file and a version associated with each file identifier, and data of the respective files, including first data of a first file having a first file identifier and a first version,
   receiving from a first user terminal via the interface second data of a second version of the first file having the first file identifier that is different from the first version of the first file identifier,
   generating difference data indicating a difference between the first data of the first version of the first file and the second data of the second version of the first file, the difference data indicating whether at least one of the one or more keywords associated with each user identifier is added or deleted in the second version of the first file compared to the first version of the first file and a position in the second version of the file where the change occurred,
   upon determining that a number of occurrences of the addition or deletion of the at least one of the keywords occurs a predetermined number or more, notifying the first user terminal of the addition or deletion of the at least one of the keywords in the second version of the first file and the position of each of the occurrences of the respective change in the second version of the first file based on the difference data.

* * * * *